United States Patent

Saijo

[11] Patent Number: 5,603,560
[45] Date of Patent: Feb. 18, 1997

[54] PROJECTION APPARATUS

[75] Inventor: Yasutsugu Saijo, Tokyo, Japan

[73] Assignee: Canon Kabushiki Kaisha, Tokyo, Japan

[21] Appl. No.: 293,597

[22] Filed: Aug. 22, 1994

Related U.S. Application Data

[63] Continuation of Ser. No. 895,644, Jun. 9, 1992, abandoned.

[30] Foreign Application Priority Data

| Jun. 14, 1991 | [JP] | Japan | 3-143271 |
| Sep. 30, 1991 | [JP] | Japan | 3-276330 |

[51] Int. Cl.⁶ ............................................. G03B 21/14
[52] U.S. Cl. .......................... 353/101; 353/120; 40/365
[58] Field of Search ................................ 353/22, 23, 24, 353/95, 96, DIG. 2, 101, 30, 35, 36, 40, 41, 120; 40/156, 159.2

[56] References Cited

U.S. PATENT DOCUMENTS

| 2,251,184 | 7/1941 | Bohannon | 88/24 |
| 2,865,248 | 12/1958 | Goldberg | 353/96 |
| 3,414,352 | 4/1968 | Johannsen et al. | 353/22 |
| 3,785,733 | 1/1974 | Bender | 355/77 |
| 4,477,991 | 10/1984 | Dreritch et al. | 40/159.2 |
| 4,858,003 | 8/1989 | Wirt et al. | 353/95 |

FOREIGN PATENT DOCUMENTS

| 1243415 | 6/1967 | Germany | 40/159.2 |
| 1284656 | 12/1968 | Germany | 40/159.2 |
| 3341223 | 5/1985 | Germany . | |
| 61-113048 | 5/1986 | Japan | 353/120 |
| 63-109430 | 9/1988 | Japan . | |
| 1-268254 | 10/1989 | Japan . | |
| 1257839 | 1/1990 | Japan . | |
| 2-201408 | 8/1990 | Japan . | |

*Primary Examiner*—William C. Dowling
*Attorney, Agent, or Firm*—Fitzpatrick, Cella, Harper & Scinto

[57] ABSTRACT

A projection apparatus comprises an illumination device for emitting onto a film an illumination light for projecting the film, an index member for focus adjustment, a moving mechanism for moving the index member to a focus adjusting position where the index member is in contact with a surface of the film within an optical path of the projection light, and a member to be operated for focus adjustment.

15 Claims, 15 Drawing Sheets

PROJECTION APPARATUS

This application is a continuation of application Ser. No. 07/895,644, field Jun. 9, 1992, now abandoned.

BACKGROUND OF THE INVENTION

1. Field of the Invention

This invention relates to a film projection apparatus for projecting an image formed on a film and more particularly to a focus adjustment mechanism and a film holding member of the film projection apparatus.

2. Description of the Related Art

The conventional film projection apparatus is arranged as shown in FIGS. 16 and 17. In the case of the film projection apparatus shown in FIG. 16, a light flux emitted from a projection light source 2, together with reflection light obtained with the light flux reflected by a reflection mirror 1, illuminates through condenser lenses 3 and 4 a film F which is disposed within a film holding member 5. A light image which comes from the film F thus illuminated is projected onto the original-board glass 9 of an image reading device through a projection lens 6 and a Fresnel lens 8. In making focus adjustment, the operator of the apparatus rotates a focus adjustment knob 11 while keeping the projected image in sight. A desired in-focus state is obtained by rotating the focus adjustment knob 11 to move via an intermediate gear 10 a lens barrel 7 which holds the projection lens 6. FIG. 17 shows this film projection apparatus in an oblique view.

With the conventional apparatus arranged in the above-stated manner, however, it has been not easy for the operator to make focus adjustment. Therefore, an image reading process has occasionally been performed to give a blurred image as a result of inadequate focus adjustment. In other words, in order to obtain a high-quality image, the operator must bring the apparatus into an adequate in-focus state by rotating the focus adjustment knob 11 while watching the image projected on the Fresnel lens 8, as shown in FIG. 17. An in-focus state can be easily attained without fail if some suitable high-contrast part that is usable as a criterion for a discrimination between an in-focus state and a defocus state exists within the projected image. However, in a case where the projected image does not have such a suitable high-contrast part, the image quality might become hardly acceptable as the apparatus tends to be in a defocus state after focus adjustment under such a condition, depending on the skill of the operator.

Further, in a case where a negative film original is projected, every bright part of the real image is dark, because the image on the film is reversed. Then, even if a suitable high-contrast part is included in the projected image, the focus adjustment work is much more difficult than in the case of a positive film original. Therefore, in such a case, the probability of a failure to obtain an acceptable image quality further increases.

With respect to the structural arrangement of the film holding member 5, the member 5 consists of an upper holding plate 13 and a lower holding plate 14, as shown in FIG. 18. These plates 13 and 14 are rotatably mounted on a hinge shaft 15 respectively by means of hinge parts 13a and 14a. A negative film original F is arranged to be sandwiched in between the upper and lower holding plates 13 and 14. Further, the negative film original F is longitudinally positioned by abutting one longitudinal end thereof on the longitudinal guide 14d of the lower holding plate 14 and transversely positioned by transverse guides 14b and 14c, which are opposed to each other on the lower holding plate 14. The upper holding plate 13 is provided with escape holes 13b, 13c and 13d for receiving the guides 14b, 14c and 14d.

The operator first turns the upper holding plate 13 around the hinge shaft 15 to open the film holding member 5. The negative film original F is set in between the opposed transverse guides 14b and 14c while abutting one longitudinal end of the film original F on the longitudinal guide 14d. The setting work on the negative film original F is completed with the upper holding plate 13 closed by turning the upper holding plate 13 around the hinge shaft 15.

However, with the conventional film holding member 5 arranged as described above, the negative film original F cannot be adequately positioned sometimes in the transverse direction and is thus set in a state of deviating from a correct setting position, depending on the condition of the film original F. In the worst case, the negative film original F is deformed by the setting work. More specifically, in cases where the negative film original F is, for example, curved in a concave shape as shown in FIG. 19, if the curving amount S exceeds the height h of the transverse guide 14c of the lower holding plate 14, the negative film original F might be set in a state of overriding the transverse guide 14c. If the film holding member 5 is closed by turning the upper holding plate 13 around the hinge shaft 15 with the negative film original F in that state, the negative film original F is set in a deflected state. In the worst case, the negative film original F is deformed under such a condition.

If the negative film original F is either in a flat state or in a convex shape, instead of the concave shape shown in FIG. 19, the film original F is safe from the above-stated trouble. However, the negative film original F is formed by coating a transparent polyester film with an emulsion. Therefore, the negative film original F might be caused to act like a bimetallic material by a difference in expansion coefficient between two matters due to ambient temperature and humidity. The negative film original F thus tends to curve in an arbitrary direction and thus might result in the concave shape to hinder adequate setting work and to be deformed by the setting work.

SUMMARY OF THE INVENTION

It is an object of this invention to provide a film projection apparatus of the kind projecting the image of a film original onto an image reading device and having a focus adjustment mechanism, characterized in that the apparatus comprises means for inserting a focus adjustment index member into a projection optical path in a state of being tightly in contact with the film original in such a way as to enable the operator of the apparatus to adequately perform focus adjustment by making a discrimination between an in-focus state and a defocus state by watching the focused state of a projected image of the index member which has a high-contrast part. Even in the event of a film original not permitting easy focus adjustment because of few high-contrast parts thereof or a negative film original showing only a vague contrast in a dark state as a whole because of its reversed image, the arrangement of the above-stated means enables the operator to make focus adjustment by watching the projected image of the index member which has a high-contrast part. Therefore, a sharply in-focus high-quality image is obtainable irrespectively of the skill of the operator in the focus adjustment work.

Another object of the invention is to provide a film projection apparatus which is not only capable of facilitating the focus determining work in the same manner as described above but also prevents the film original from being abraded by the above-stated focus adjustment index member. To attain that object, the film projection apparatus comprises means for causing the index member to approximately perpendicularly come to abut on the surface of a film original at least immediately before abutting on the surface of the film original.

A further object of the invention is to provide a film projection apparatus having a film holding member, a focus adjustment mechanism and a mechanism for causing a focus adjustment index member to enter a projection optical path in a state of abutting on a film original, characterized in that the apparatus comprises means for fixedly engaging the film holding member when the index member has entered the projection optical path. By this means, the film holding member is held immovable unless the index member is retracted from the projection optical path. Therefore, the film original can be effectively prevented from being damaged by sliding friction with the index member.

A further object of the invention is to provide a film projection apparatus which, in addition to the above-stated arrangement, comprises means for preventing the focus adjustment index member from entering the projection optical path when the film holding member is not in a film projecting position. The focus adjustment index member is thus prevented from coming into contact with the film holding member by that means.

A still further object of the invention is to provide a projection apparatus of the above-stated kind, wherein a film holding member which is arranged to determine the transverse position of a negative film original by means of a pair of opposed positioning guide parts included in one of two holding plates and to have the negative film original sandwiched in between these two holding plates is provided with restricting means which is arranged at least on one of the opposed pair of positioning guide parts to restrict and prevent the negative film original from buoying up more than a given extent from the holding plate. The film original thus can be reliably positioned in the transverse direction thereof by virtue of the restricting means.

The above and other objects and features of this invention will become more apparent from the following detailed description of embodiments thereof taken in connection with the accompanying drawings.

DETAILED DESCRIPTION OF THE PREFERRED EMBODIMENTS

Figure 1:
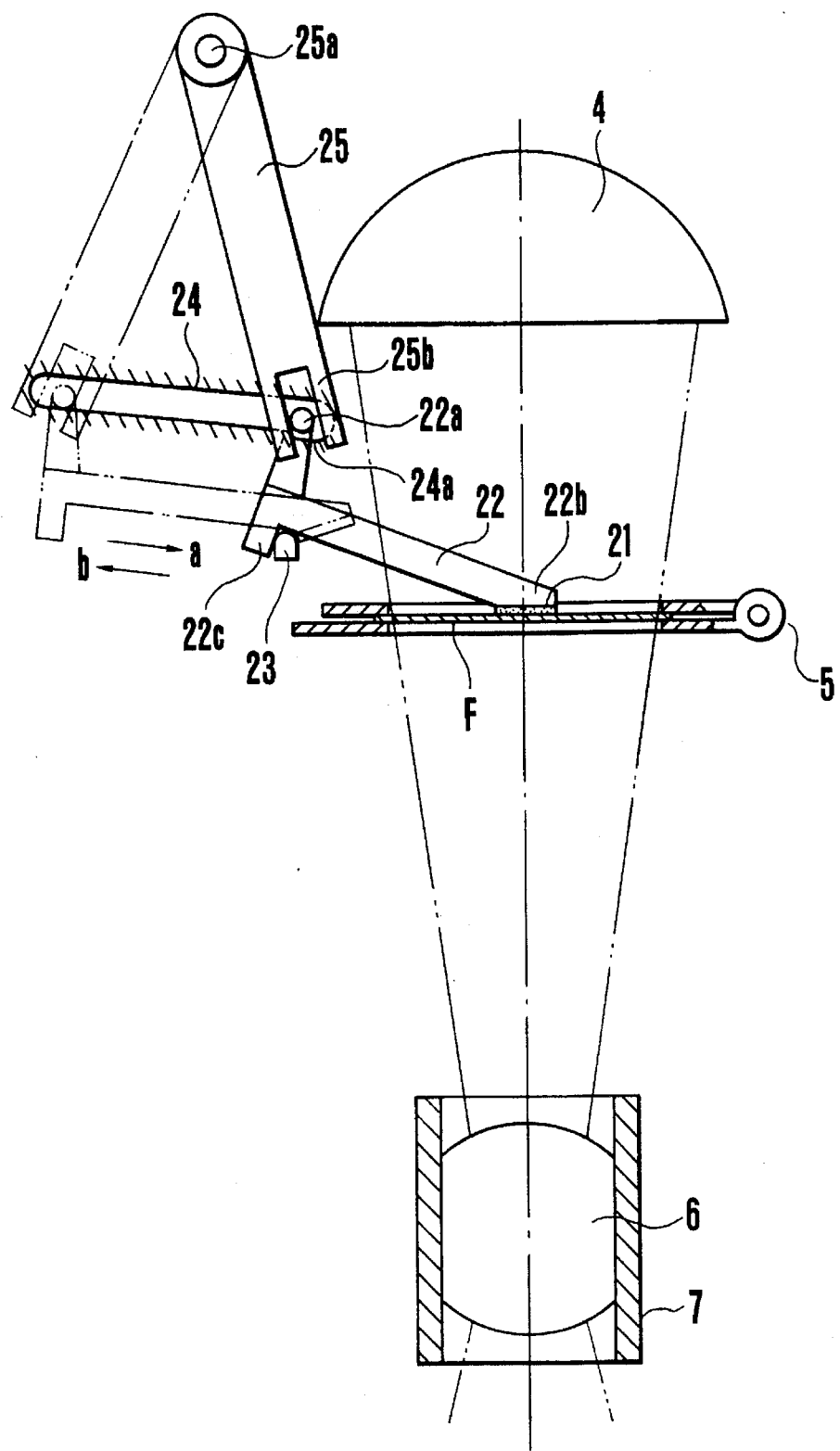
FIG. 1 is a sectional view showing the essential parts of a film projection apparatus arranged according to this invention as a first embodiment thereof.
Figure 2:
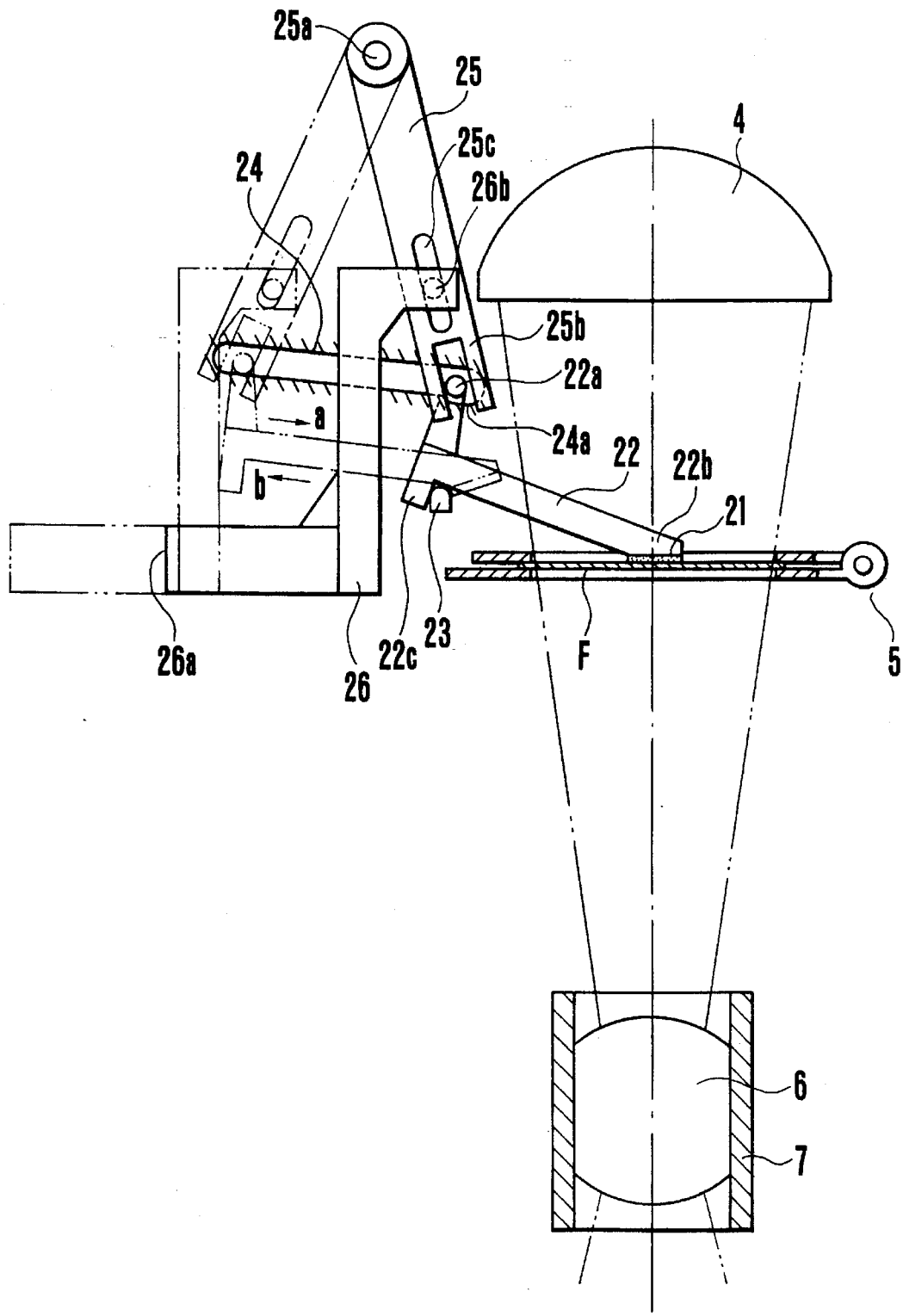
FIG. 2 is a sectional view also showing the essential parts of the first embodiment.
Figure 3C:
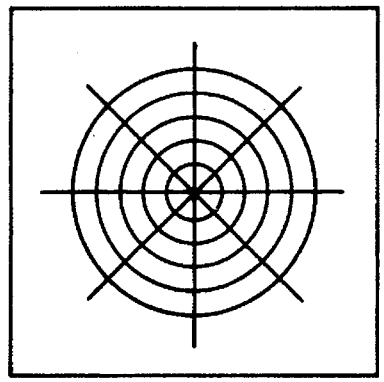
FIGS. 3(A), 3(B) and 3(C) show the examples of an index shown in FIG. 1.
Figure 3B:
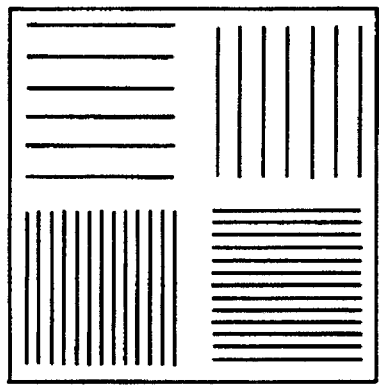
Figure 3A:
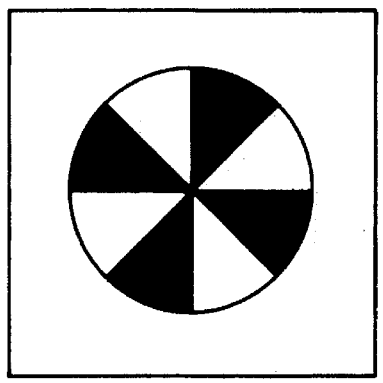
Figure 4:
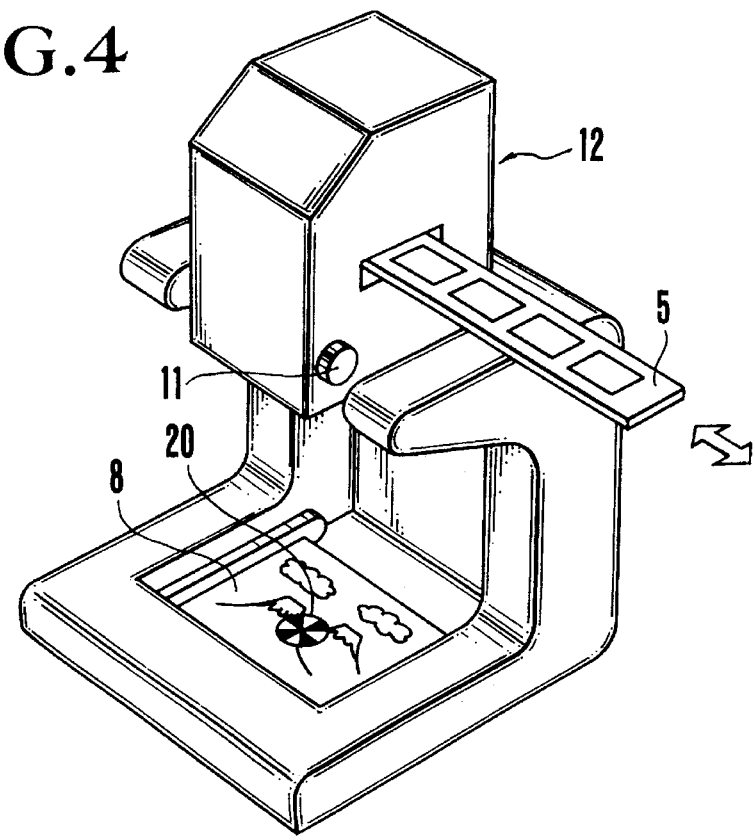
FIG. 4 is an oblique view showing a film projection apparatus which is arranged as shown in FIG. 1.
Figure 5:
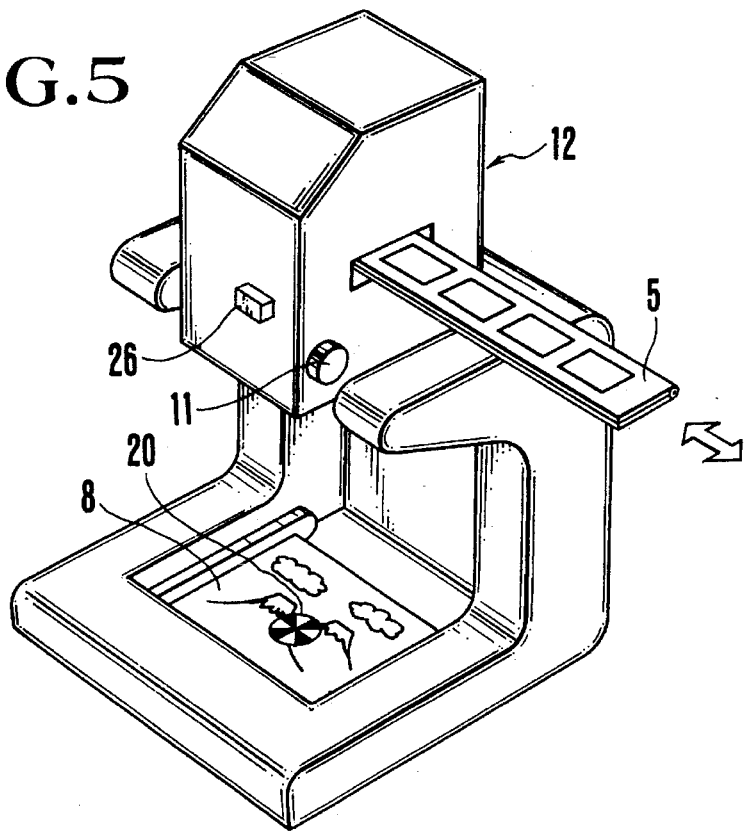
FIG. 5 is an oblique view showing a film projection apparatus which is arranged as shown in FIG. 2.
Figure 16:
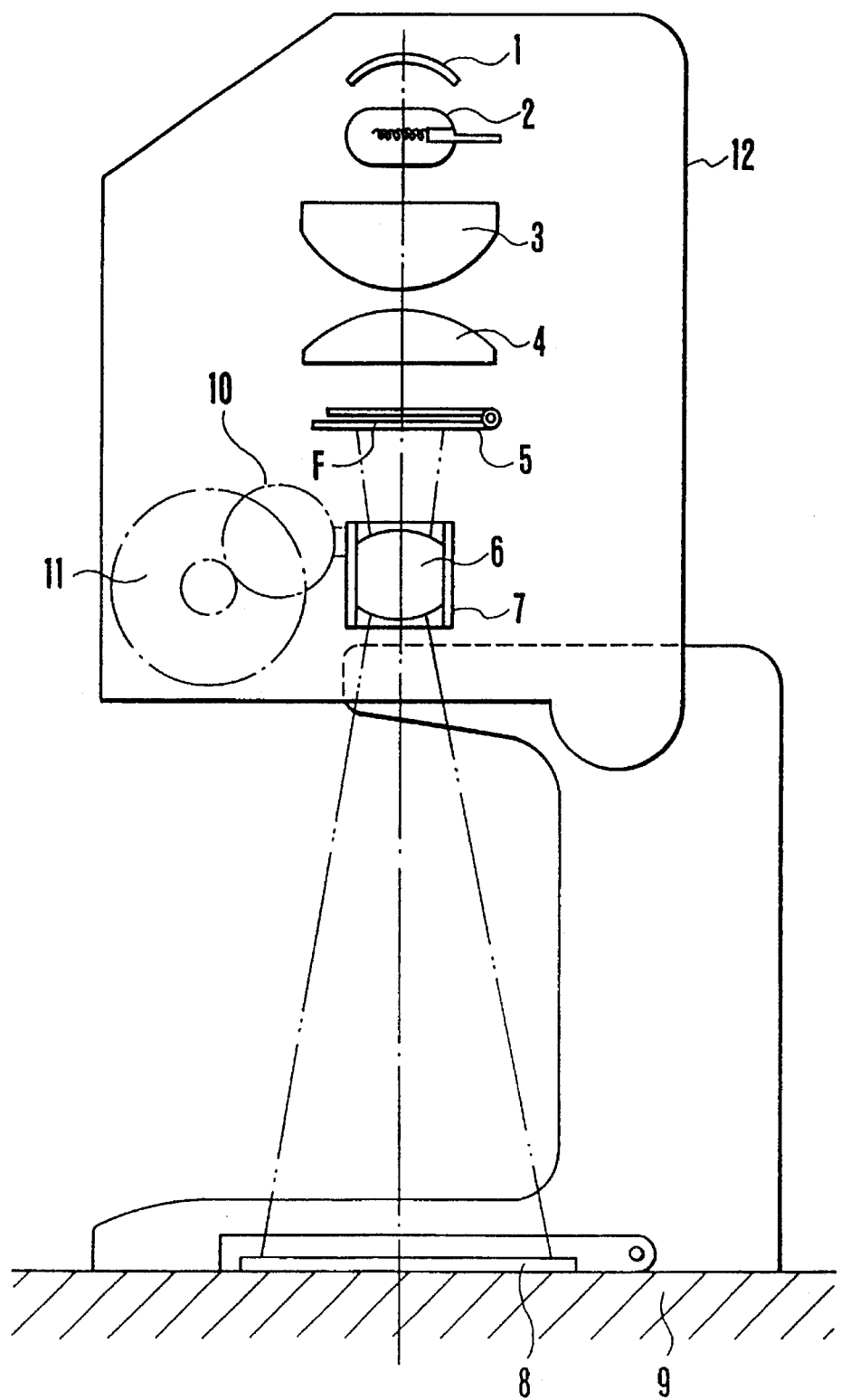
FIG. 16 is a sectional view showing the conventional film projection apparatus.
Figure 17:
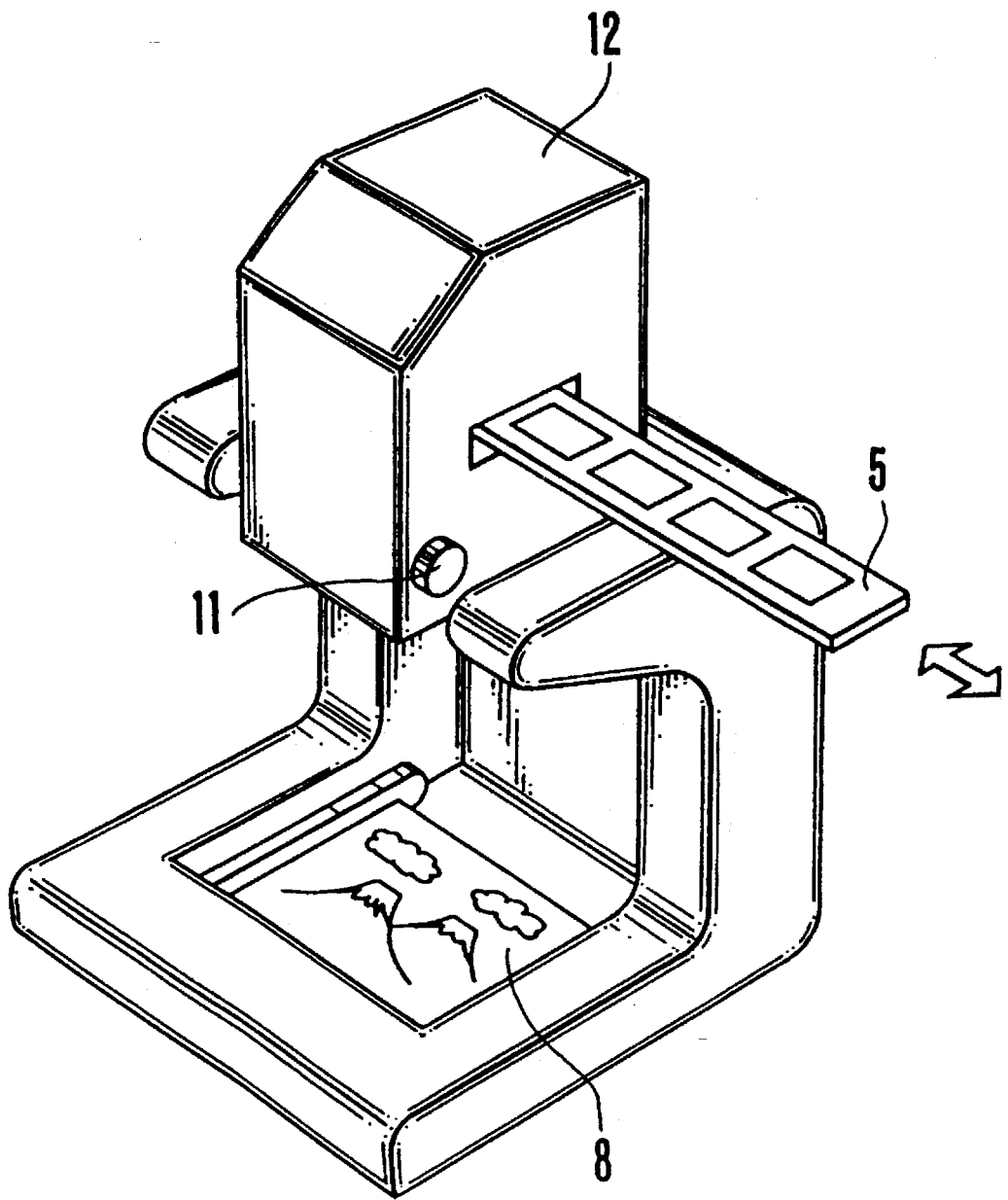
FIG. 17 is an oblique view showing the conventional film projection apparatus.
Figure 18:
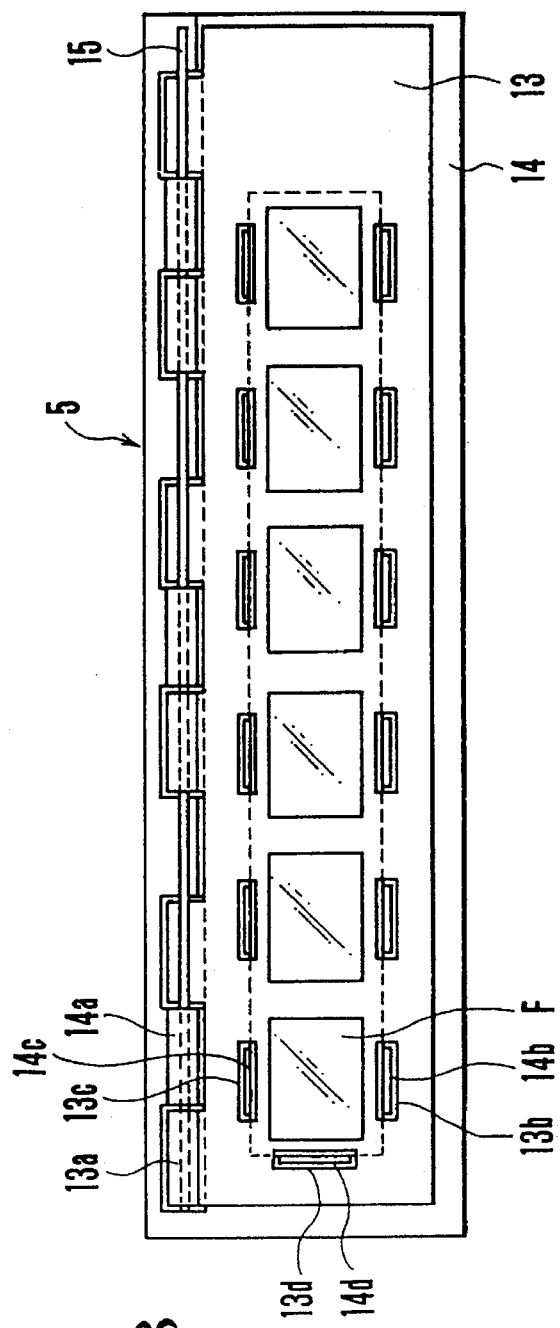
FIG. 18 is a top view showing the film holding member of the conventional film projection apparatus.

The following describes a first embodiment of this invention with reference to FIGS. 1 to 5: FIGS. 1 and 2 are enlarged views showing a film original setting part and parts arranged around it in a film projection apparatus which is the first embodiment of the invention. In these drawings, parts similar to the parts of FIG. 16 are indicated by the same reference numerals. FIGS. 3(A), 3(B) and 3(C) show examples of an index used in accordance with this invention. FIGS. 4 and 5 are oblique views showing the film projection apparatus in a focus adjusting state.

Referring to FIG. 1, an index film 21 is stuck to a holder 22. A supporting projection 23 which is provided on the casing of the film projection apparatus vertically supports the holder 22. A shaft 22a which is provided on the holder 22 engages a slot 24 formed in the casing. In this state, the holder 22 is carried by a U-shaped part 25b formed at the fore end of a swing lever 25 which has its rotation shaft 25a engaging the casing. When the holder 22 is in a position indicated by two-dot chain lines in the drawing, the fore end 22b of the holder 22 and the index film 21 are retracted to the outside of the area of a projection optical path indicated by two-dot chain lines in the drawing. When focus adjusting work begins, a mechanism which is not shown causes the swing lever 25 to swing counterclockwise, as viewed on the drawing, from its position indicated by two-dot chain lines. This movement of the lever 25 causes the shaft 22a of the holder 22 to be pushed by the U-shaped part 25b of the lever 25. As a result, the holder 22 moves in the direction of arrow "a" with the lower face of the fore end 22b sliding over the supporting projection 23. When the holder 22 moves further in the direction of arrow "a", a projection 22c located at the lower part of the holder 22 comes to impinge on the supporting projection 23. Then, since one end 24a of the slot 24 of the casing is formed to be wider than other parts of the slot 24, the shaft 22a of the holder 22 disengages the U-shaped part 25b of the swing lever 25. After that, the weight of the holder 22 itself causes the holder 22 to turn clockwise around the supporting projection 23 until the index film 21 comes to abut on a film (original) F to be in a position as indicated by full lines in the drawing. The index film 21 is thus arranged to come perpendicularly from above to abut on the film F, so that the film F can be prevented from being abraded by sliding friction with the index film 21 at the time of contact. Upon completion of focus adjusting work by the operator under this condition, the mechanism which is not shown causes the swing lever 25 to swing clockwise as viewed on the drawing. Then, the U-shaped part 25b formed at the fore end of the swing lever 25 comes to abut on the shaft 22a of the holder 22. When the swing lever 25 swings further, the holder 22 turns counterclockwise, as viewed on the drawing, as if it is pulled up with the supporting projection 23 acting as a fulcrum. The index film 21 is detached from the film F by this. The index film 21 then moves perpendicularly upward off from the film F, so that sliding; friction between the film F and the index film 21 can be prevented also this time. The holder 22 moves in the direction of arrow "b" as the swing lever 25 swings further clockwise, as viewed on the drawing, until there is obtained a state as shown by two-dot chain lines in the drawing. With the embodiment in this state, as mentioned in the foregoing, the fore end 22b of the holder 22 and the index film 21 are retracted outside the area of the projection optical path as indicated by two-dot chain lines. Since the index film 21 is thus retracted, it is possible to read out the real film image projected.

In the case of FIG. 2, the projection apparatus is provided with an operation part to be operated by the operator for moving the index film 21. In FIG. 2, a reference numeral 26 denotes an adjustment button which serves as the operation part and has its shaft part 26b engaging a slot 25c formed in the swing lever 25. When the operator pushes the fore end part 26a of the adjustment button 26 to begin focus adjustment work, the swing lever 25 swings counterclockwise as viewed on the drawing as the slot 25c is engaging the shaft part 26b of the button 26. Then, the index film 21 is moved into the projection optical path by the mechanism described in the foregoing.

FIGS. 3(A), 3(B) and 3(C) show some examples of an index formed on the index film 21. The index is preferably formed to have either a high-contrast part or clear image edges in such a way as to facilitate making a discrimination between an in-focus state and a defocus state in the focus adjustment work, as shown in FIG. 3(A), 3(B) or 3(C). FIG. 4 shows the focus adjustment work being performed by using the index shown in FIG. 3(A). An in-focus state is obtainable with a focus adjustment knob 11 rotated by the operator while watching a projected index 20 which is superposed on an image projected on a Fresnel lens 8. FIG. 5 shows the arrangement of FIG. 2 in an oblique view under the focus adjustment work. In this case, the apparatus is provided with an adjustment button 26 which is disposed, as shown, on one side of the apparatus.

Figure 6:
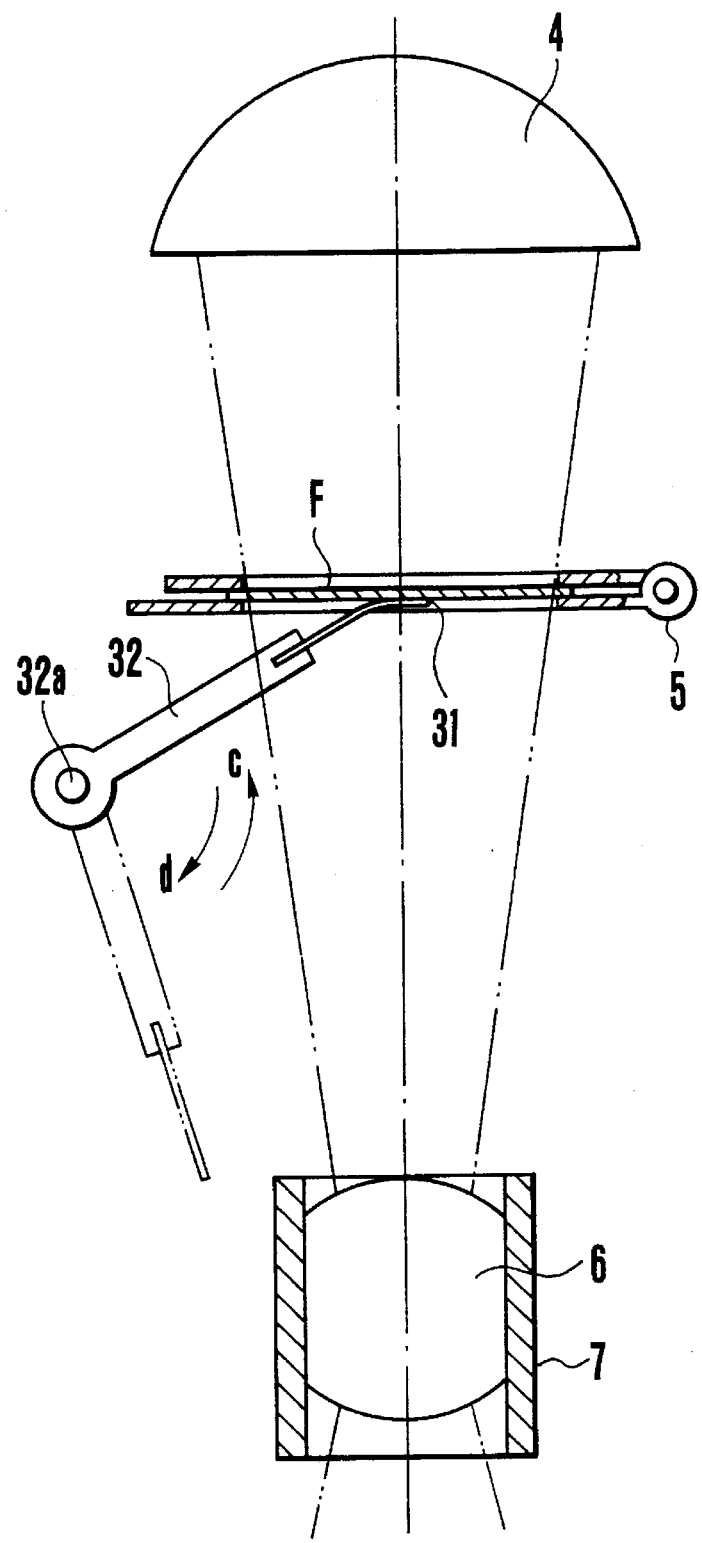
FIG. 6 is a sectional view showing the essential parts of a film projection apparatus arranged as a second embodiment of the invention.

FIG. 6 shows the arrangement of the essential parts of a second embodiment of this invention. In the second embodiment, an index film 31 is carried by a holder 32 which is supported by a casing in such a way as to be swingable on a shaft 32a. In making a focus adjustment, the index film 31 is caused to abut on the lower surface of a film (original) F by utilizing its resilient force. Since an image is formed on the upper surface of the film F, the position of the index is deviating from the actual image on the film F as much as the thickness of the film F, which is about 0.1 mm in general. However, if the depth of field of a projection lens 6 of the film projection apparatus exceeds the thickness of the film F, a focused state of the projected image of the index can be regarded as virtually equivalent to a focused state of the projected image of the film original. It, therefore, presents no problem to make focus adjustment by watching the projected image of the index instead of the projected image of the film original.

In reading the image, the holder 32 of this embodiment is turned around the shaft 32a in the direction of arrow "d" to retract it from a position indicated by full lines to a position located outside a projection optical path as indicated by two-dot chain lines. The index film 31 is thus arranged to be attached to and detached from the film F almost perpendicularly from below. Therefore, the abrasion of the film F by sliding friction with the index film 31 can be minimized.

Figure 7:
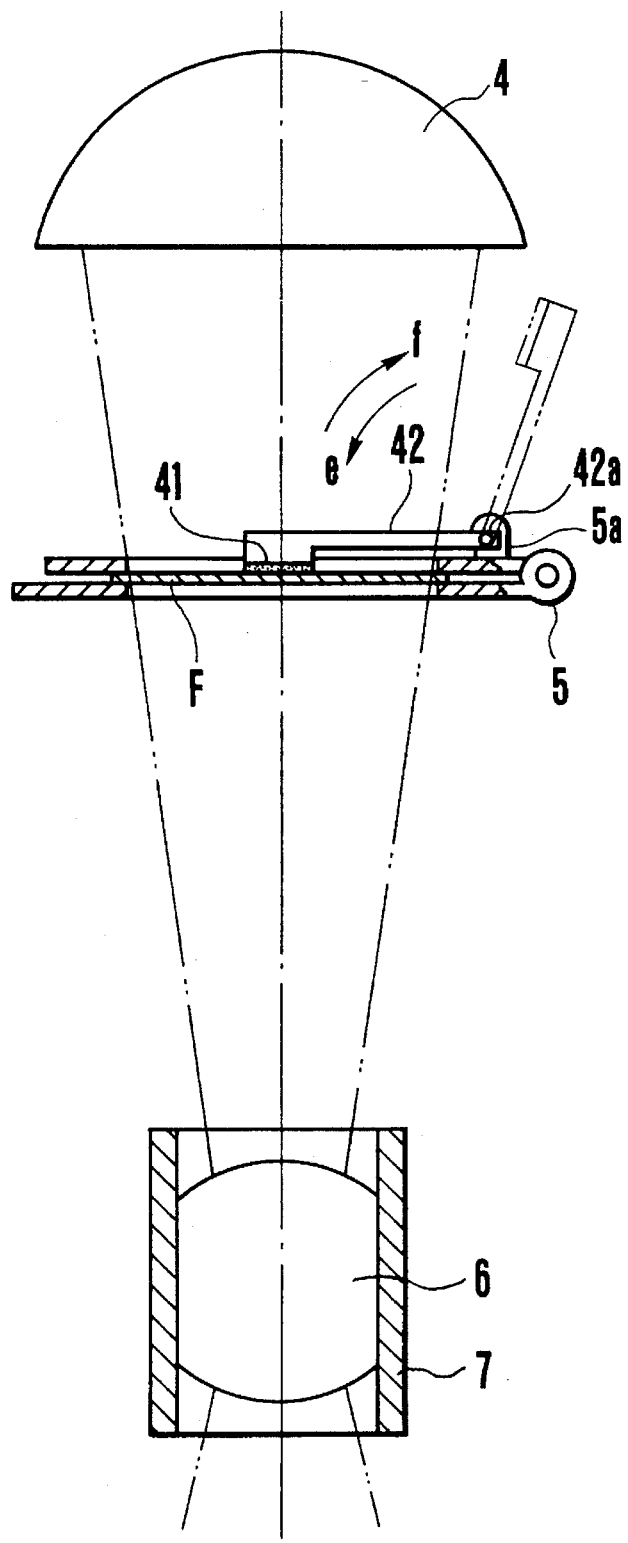
FIG. 7 is a sectional view showing the essential parts of a film projection apparatus arranged as a third embodiment of the invention.

FIG. 7 shows the arrangement of the essential parts of a third embodiment of the invention. The third embodiment is arranged, unlike the first and second embodiments described, as follows: A holder 42 which holds an index film 41 is attached not to the body (or casing) of the film projection apparatus but to a film holding member 5, which is detachably mounted on the body of the film projection apparatus. More specifically, the holder 42 is carried by the bearing part 5a of the film holding member 5 in such a way as to be swingable on a shaft 42a which is disposed at one end of the holder 42. The holder 42 is thus arranged to be movable between a set position indicated by full lines and a retracted position indicated by two-dot chain lines. The invention is practicable even in cases where the index film is mounted, like in this embodiment, on some member other than the body of the apparatus, such as the film holding member.

Figure 8:
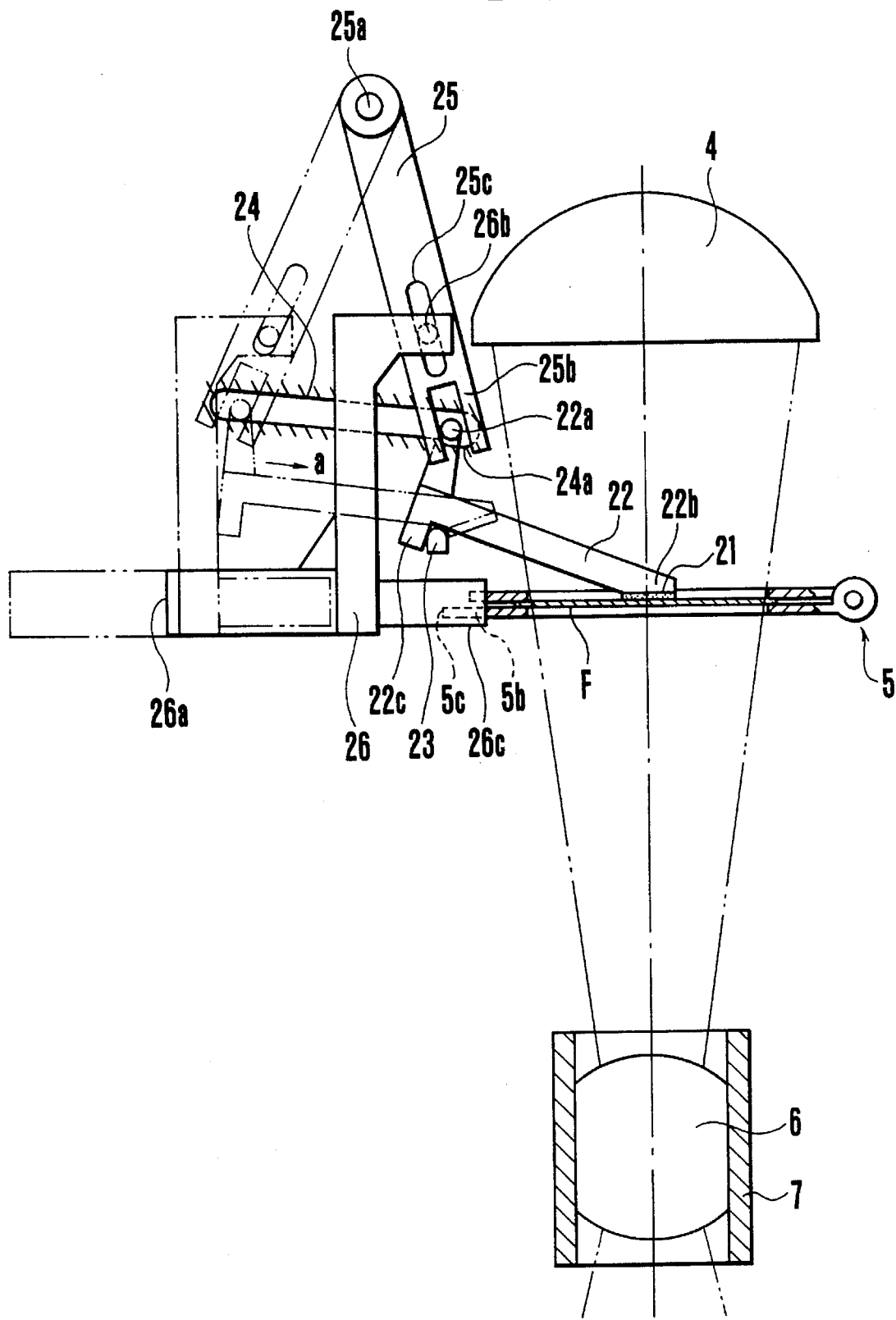
FIG. 8 is a sectional view showing the essential parts of a film projection apparatus arranged as a fourth embodiment of the invention.
Figure 9:
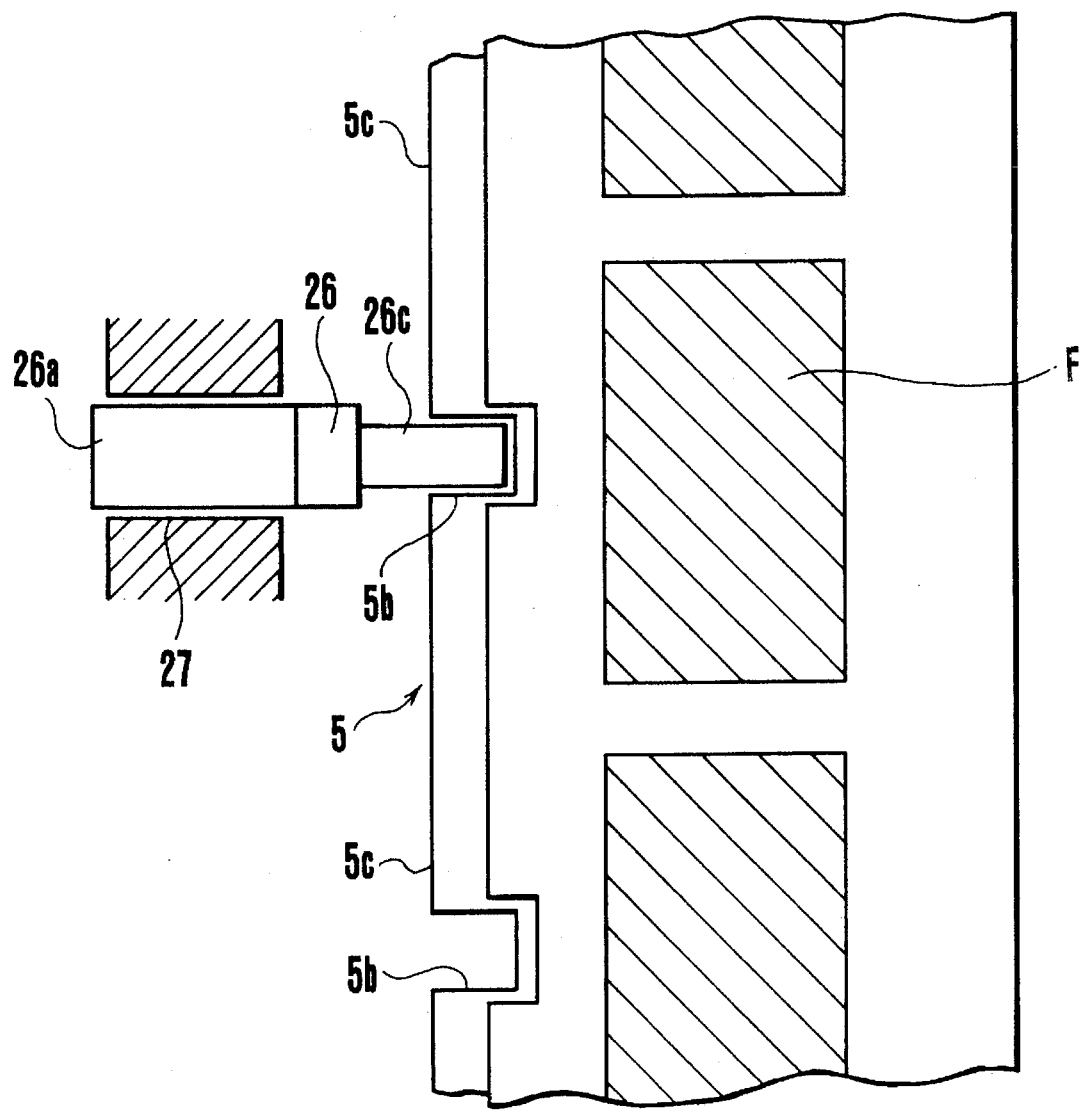
FIG. 9 is a top view showing a fixing mechanism for fixing the film holding member of the fourth embodiment in position.

Next, a fourth embodiment of this invention is described with reference to FIGS. 8 and 9, wherein FIG. 8 is a longitudinal sectional view showing the essential parts of the fourth embodiment, and FIG. 9 is a transverse sectional view showing the essential parts of the fourth embodiment. In the fourth embodiment, parts 4 to 7 and 21 to 26b are similar to those parts of the first embodiment shown in FIG. 2. In the fourth embodiment, a protruding part 26c is disposed in front of the adjustment button 26 (on the side opposite to the fore end part 26a of the button 26). The film holding member 5 has a peripheral part 5c which is opposed to the protruding part 26c and is provided with notches 5b. The notches 5b are formed, in a projection setting position for every film image, and arranged to be capable of engaging the protruding part 26c of the adjustment button 26. A casing guide 27 is arranged to guide the fore end part 26a of the adjustment button 26. The rest of the fourth embodiment is arranged in the same manner as in the cases of FIGS. 2, 5 and 16 used in the foregoing description.

With the fourth embodiment arranged as described above, the operator of the apparatus pushes the fore end part 26a of the adjustment button 26 which slidably engages the casing guide 27 for focus adjustment work, the holder 22 moves forward in the direction of arrow "a" in the same manner as in the case of the first embodiment. The fore end part 26a thus causes the index film 21 to abut on the film F. At the same time, the protruding part 26c of the adjustment button 26 comes to engage the notch 5b of the film holding member 5. The film holding member 5 is thus fixed in position as shown in FIG. 9. Under this condition, the film holding member 5 is immovably held by the engagement of the protruding part 26c of the adjustment button 26 with the notch 5b of the film holding member 5. When the operator pulls back the adjustment button 26 to the left, as viewed on the drawing, after completion of focus adjustment, the protruding part 26c disengages the notch 5b of the film holding member 5. The film holding member 5 then becomes movable.

The following describes the operation of the embodiment performed when the film holding member 5 is not in the film projecting position: Referring to FIG. 9, with the film holding member 5 not in the film projecting position, the protruding part 26c of the adjustment button 26 comes to impinge on the peripheral part 5c of the film holding member 5 and would not move any further even if the operator pushed the adjustment button 26. The holder 22 to which the index film 21 is attached comes to a stop in a position before the position indicated by full lines in FIG. 8. Therefore, even if the operator happens to push the adjustment button 26 while the film holding member 5 is not in the film projecting position, the index film 21 and the holder 22 are prevented from coming into contact with the film F and the film holding member 5.

Figure 10:
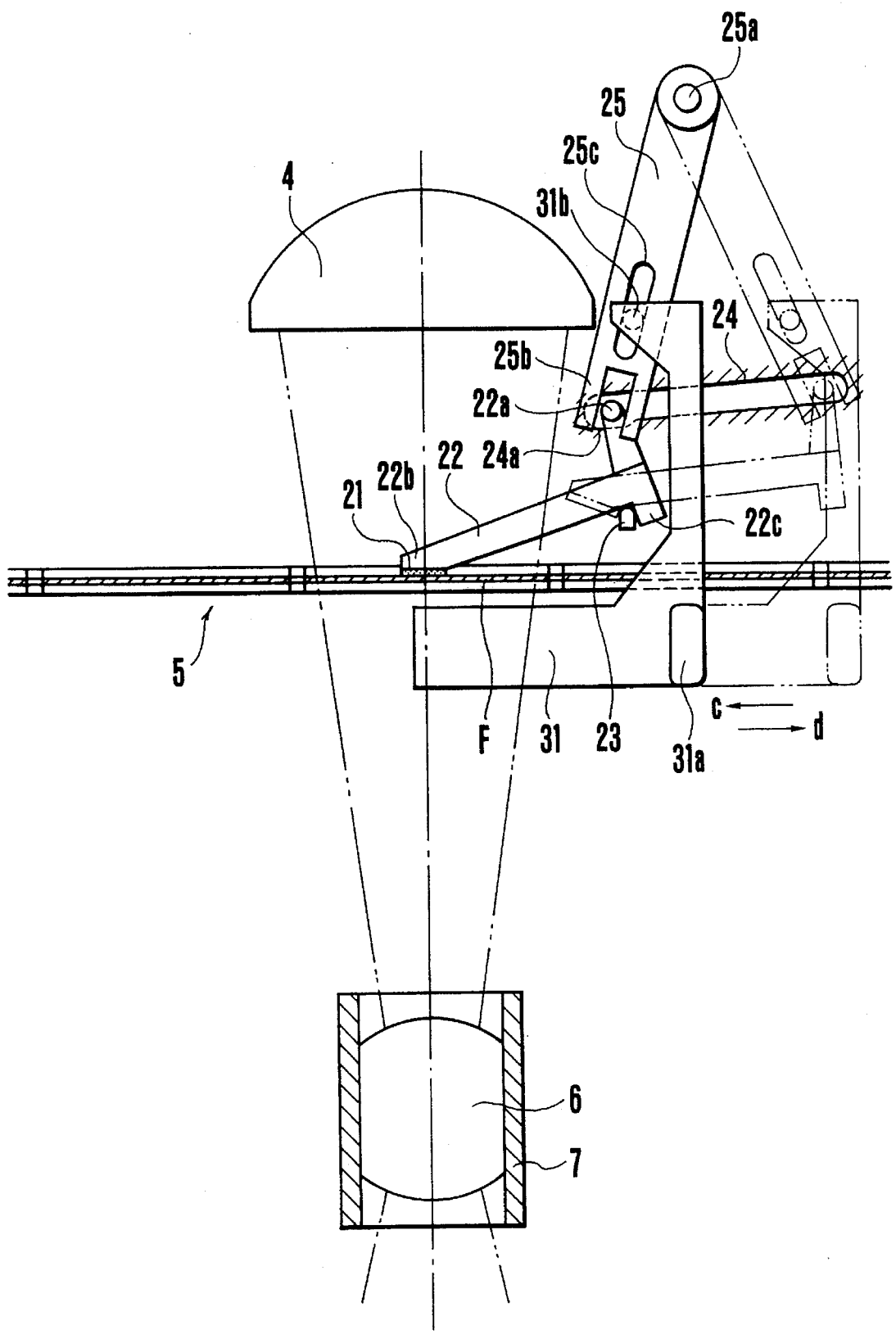
FIG. 10 is a sectional view showing the essential parts of a film projection apparatus arranged as a fifth embodiment of the invention.
Figure 11:
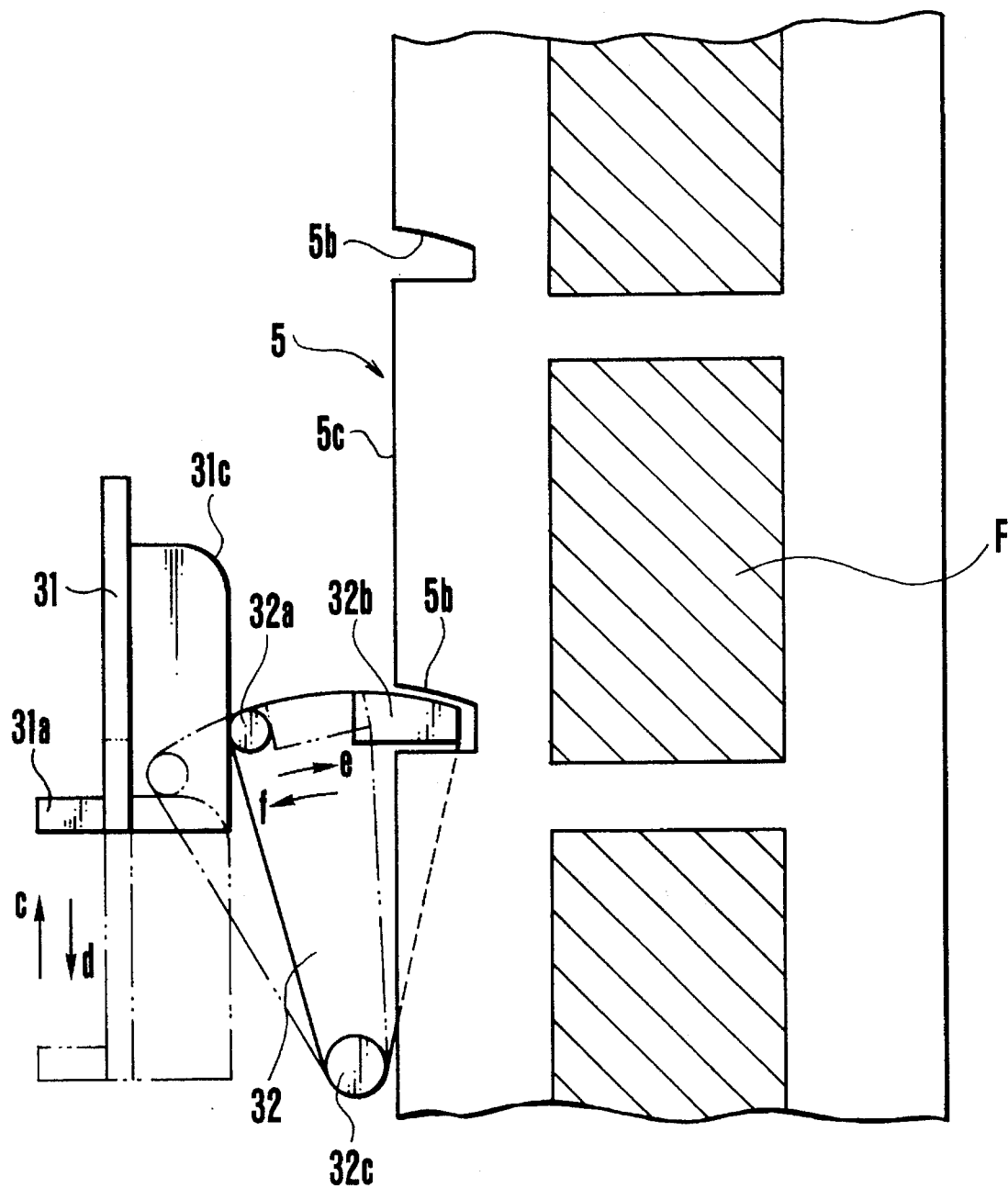
FIG. 11 is a top view showing a fixing mechanism for fixing the film holding member of the fifth embodiment.

A fifth embodiment of the invention is arranged as shown in FIGS. 10 and 11. In the fourth embodiment described above, the adjustment button is arranged to be pushed in. In the case of the fifth embodiment, this pushing arrangement is changed to a sliding arrangement. Referring to FIGS. 10 and 11, an adjustment button 31 is arranged to be slidable over a casing which is not shown. The adjustment button 31 is provided with a knob part 31a which is disposed in front and a shaft part 31b and a protruding part 31c which are disposed in rear. The shaft part 31b engages a slot 25c which is formed in a swing lever 25. A lock lever 32 is swingably interposed in between the adjustment button 31 and a film holding member 5. The lock lever 32 is provided with a shaft part 32a which is arranged on one side of the lever 32 to abut on the peripheral edge of the protruding part 31c of the adjustment button 31, and a protruding part 32b which is arranged on the other side of the lever 32 to engage and disengage one of notches 5b formed in the film holding member 5. The rest of the arrangement of the fifth embodiment is similar to that of the fourth embodiment.

With the fifth embodiment arranged as described above, when the operator of the apparatus slides the knob part 31a of the adjustment button 31 from its position indicated by a two-dot chain line in FIG. 10 in the direction of arrow "c" for focus adjustment, the shaft part 31b of the adjustment button 31 moves also in the direction of arrow "c". The swing lever 25 then swings clockwise, as viewed on the drawing. The U-shaped part 25b of the swing lever 25 comes to push the shaft 22a of a holder 22. With the shaft 22a thus pushed, the holder 22 moves in the direction of arrow "c" while sliding the lower surface of its fore end 22b over a supporting projection 23. When the holder 22 moves further in the direction of arrow "c", the lower projection 22c of the holder 22 comes to impinge on the supporting projection 23. A slot 24 which is formed in the casing has one end 24a of it formed to be wider than other parts. The wider end 24a allows the shaft 22a of the holder 22 to part from its state of abutting on the U-shaped part 25b of the swing lever 25 and to turn counterclockwise, as viewed on the drawing, by its own weight, with the supporting projection 23 used as a fulcrum, until the index film 21 comes to abut on the film F. The holder 22 thus takes its position as shown by full lines in the drawing. The index film 21 is thus arranged to come to abut on the film F perpendicularly from above to prevent any abrading friction between the film F and the index film 21.

Referring to FIG. 11, with the adjustment button 31 slid in the direction of arrow "c" as mentioned above, the protruding part 31c of the adjustment button 31 pushes the shaft part 32a of the lock lever 32. The lock lever 32 is thus caused to swing in the direction of arrow "e". The protruding part 32b of the lock lever 32 then comes to engage the notch 5b provided in the film holding member 5 as indicated by full lines in FIG. 11. Under this condition, the engagement of protruding part 32b of the lock lever 32 and the notch 5b of the film holding member 5 holds the film holding member 5 immovable.

When the operator of the apparatus brings the adjustment button 31 back to its position indicated by two-dot chain lines in the drawing by pushing it in the direction of arrow "d" upon completion of focus adjustment work, the lock lever 32 which is under an urging force of a mechanism (not shown) swings in the direction of arrow "f" following the movement of the adjustment button 31. The engaged relation between the protruding part 32b of the lock lever 32 and the notch 5b of the film holding member 5 then disappears to make the member 5 movable.

When the film holding member 5 is not in a film projecting position, even if the operator slides the adjustment button 31 in the direction of arrow "c" as shown in FIG. 11, the protruding part 32b of the lock lever 32 which swings in the direction of arrow "e" following the sliding movement comes to impinge on the edge part 5c of the film holding member 5 to make the adjustment button 31 immovable any further. The holder 22 to which the index film 21 is stuck then comes to a stop before it reaches its position indicated by full lines as shown in FIG. 10. Therefore, the index film 21 and the holder 22 is effectively prevented from coming into contact with the film F and the film holding member 5 even if the operator happens to slide the adjustment button 31 in the direction of arrow "c" when the film holding member 5 is not in its film projecting position.

In the event of a film original for which focus adjustment is difficult because of few clear image edge parts or a negative film original which is dark as a whole showing little contrast because of a reversed state, the use of the index member which has a high contrast part enables the operator to adequately make focus adjustment by watching a projected image of the index member. A high-quality image thus can be obtained without any blur irrespectively of skill in the focus adjustment work.

The embodiment is provided with the means for causing the index member to approximately perpendicularly come to abut on the surface of the film original at least at the time of bringing the former into contact with the latter. Therefore, the embodiment not only facilitates focus determining work but also prevents the index member from damaging the film original by friction when it abuts on the film original.

The embodiment is further provided with the means for locking the film holding member when the index member enters the projection optical path. This locking means effectively prevents both the index member and the film original from being frictionally damaged by the movement of the film holding member when the film holding member is in contact with the index member. Therefore, the embodiment not only gives a high-quality image but also prevents the index member from being damaged.

Further, the provision of means for preventing the index member from coming into the projection optical path when the film holding member is not in the film projecting position effectively prevents the index member and the index-member holding member from coming into contact with the film original and the film-original holding member, so as to protect the index-member, the index-member holding member and the film original from being damaged by friction, even if the index member is urged to enter the projection optical path by focus adjustment work inadvertently performed by the operator when the film holding member is not in the film projecting position.

Figure 12:
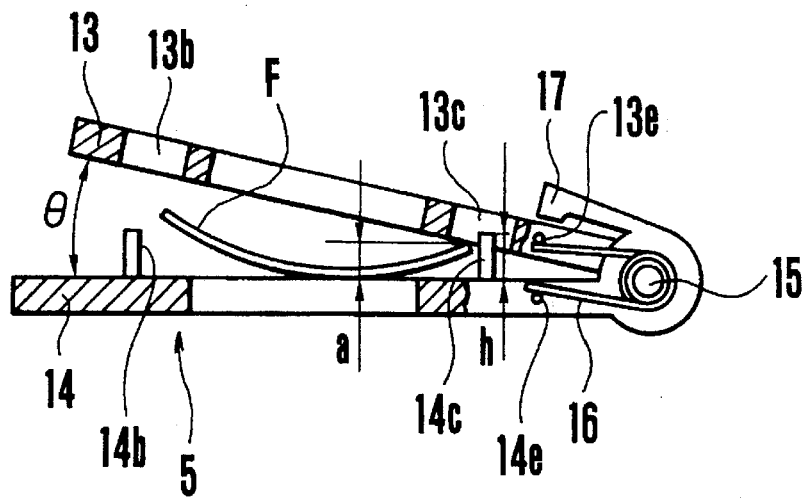
FIG. 12 is a sectional view showing the film holding member of a film projection apparatus arranged as a sixth embodiment of the invention.
Figure 19:
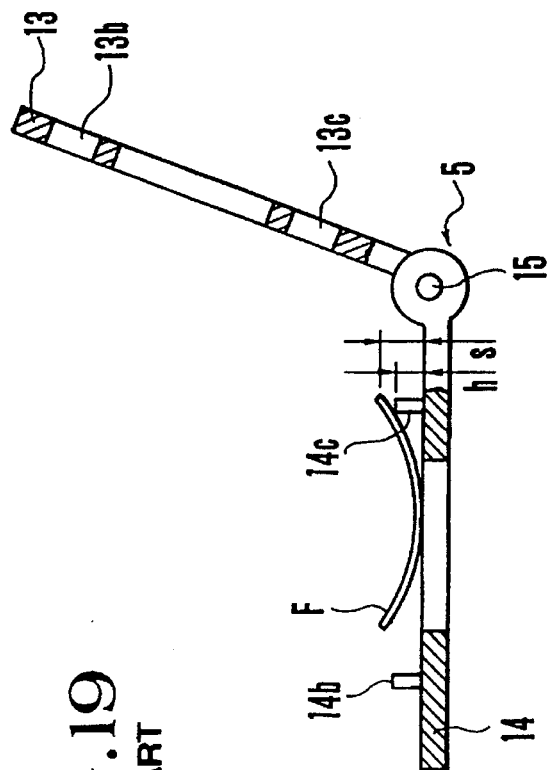
FIG. 19 is a sectional view showing the film holding member of the conventional film projection apparatus.

Next, a sixth embodiment of the invention is described with reference to FIG. 12. FIG. 12 is a sectional view showing the essential parts of the sixth embodiment. In FIG. 12, members 13, 14 and 15 are similar to those of the conventional apparatus shown in FIG. 19.

Referring to FIG. 12, the upper holding plate 13 and the lower holding plate 14 are urged to move in the direction of opening them by an opening spring 16 which is wound around the hinge shaft 15 with one end of the opening spring 16 attached to a hook part 13e provided at one end of the upper holding plate 13 and with the other end of the opening spring 16 attached to a hook part 14e provided at one end of the lower holding plate 14. The maximum opening angle θ between the upper and lower holding plates 13 and 14 are set in such a manner that the height "a" of the lower side (inner side) of the upper holding plate 13 at the transverse guide 14c located nearer to the hinge shaft 15 does not exceed the height "h" of the transverse guide 14c, by restricting the movable amount of the upper holding plate 13 with a rotation stopper 17, which is arranged in one body with the lower holding plate 14 on the side of the hinge shaft 15. With the exception of this arrangement, the rest of the sixth embodiment is arranged in the same manner as the conventional apparatus shown in FIG. 19.

With the sixth embodiment arranged in this manner, the operator inserts the negative film original F into the film holder 5 from the left side of the holder 5, as viewed on the drawing, to set it as shown in the drawing. In this instance, the whole film holding member 5 is slanted downward to the right so as to allow the negative film original F to come to impinge on the transverse guide 14c without fail by virtue of its own weight. Then, since the upward position of the right end of the negative film original F is restricted by the lower surface of the upper holding plate 13, the negative film original F never overrides the transverse guide 14c even in a case where the negative film original F is in a concave shape as shown in the drawing. The film original F, therefore, can be adequately set. The operator then turns the upper holding plate 13 counterclockwise, as viewed on the drawing, to close the film holding member 5 with the member 5 as a whole left in the posture of slanting downward to the right. The film holding member 5 is then locked by a mechanism which is not shown. The setting work on the negative-film original F thus comes to an end.

Figure 13:
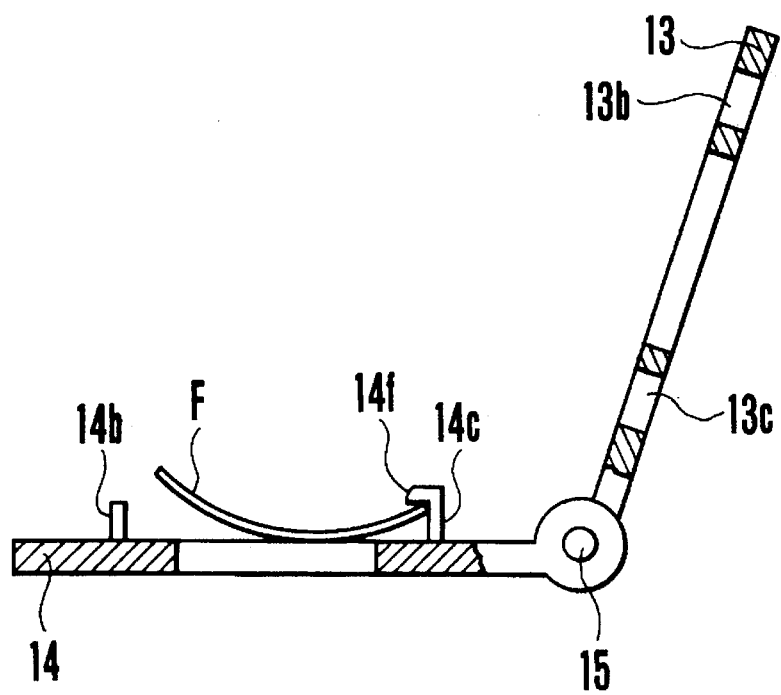
FIG. 13 is a sectional view showing the film holding member of a seventh embodiment of the invention in an open state.
Figure 14:
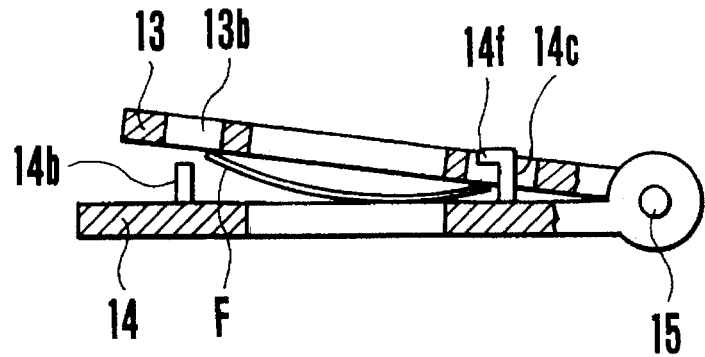
FIG. 14 is a sectional view showing the film holding member of the seventh embodiment in a closed state.

A seventh embodiment of the invention is arranged as shown in FIGS. 13 and 14. In the case of the seventh embodiment, the setting arrangement of the negative film original F is improved as follows: The upper holding plate 13 is arranged to be completely openable relative to the lower holding plate 14 like in the case of the conventional arrangement shown in FIG. 19. In addition to that, an overhanging part 14f is provided at the fore end of the transverse guide 14c of the lower holding plate 14 for restricting the upper position of the negative film original F on the right side, as viewed on the drawing. With the exception of this point, the seventh embodiment is arranged in the same manner as the conventional arrangement shown in FIG. 19.

With the seventh embodiment arranged in this manner, the operator first completely opens the film holding member 5 by turning the upper holding plate 13 clockwise on the hinge shaft 15, as shown in FIG. 13. After that, a negative film original F is slid and inserted from above and from the left side of the lower holding plate 14. The negative film original F is thus set in a state of having its edge engaging the overhanging part 14f of the transverse guide 14c. In this instance, the negative film original F can be set by sliding it to a lesser extent than in the case of the sixth embodiment as the upper holding plate 13 is completely opened. The film original F thus can be more easily set. Further, with the whole film holding member 5 slanted downward to the right in the same manner as in the case of the sixth embodiment, the negative film original F is allowed to abut on the transverse guide 14c without fail by virtue of its own weight. After that, when the operator turns the upper holding plate 13 counterclockwise, as viewed on the drawing, the lower surface of the upper holding plate 13 gradually comes to abut on the negative film original F to correct the curved state of the negative film original F while the negative film original F is thus being set in place as shown in FIG. 14.

Figure 15:
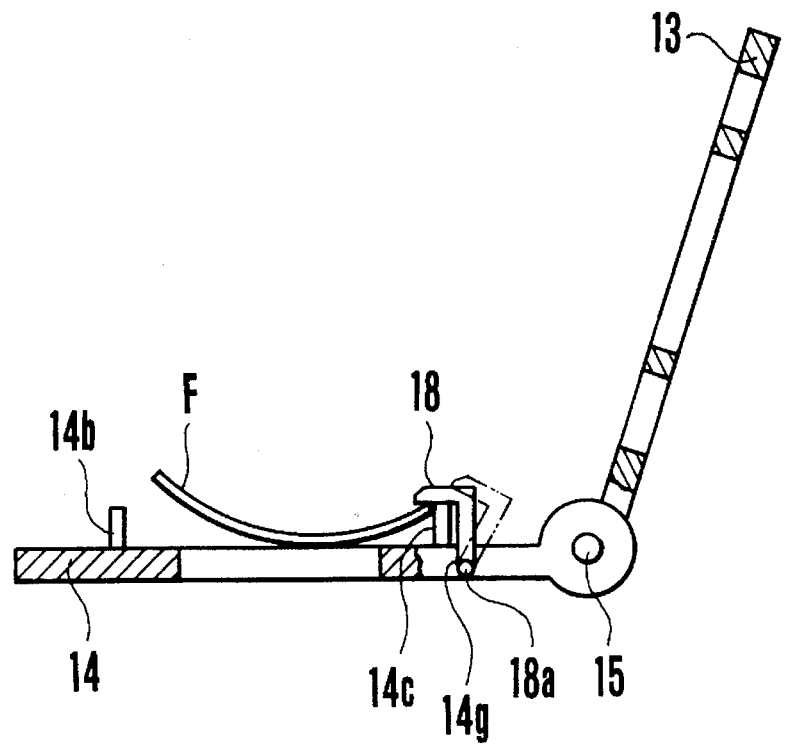
FIG. 15 is a sectional view showing the film holding member of an eighth embodiment of the invention.

An eighth embodiment of the invention is arranged as shown in FIG. 15. In the case of the eighth embodiment, the arrangement of the transverse guide 14c of the lower holding plate 14 which is provided with the overhanging part 14f in the seventh embodiment is changed as follows: In addition to the transverse guide 14c of the lower holding plate 14, an overhanging member 18 is arranged adjacently to the transverse guide 14c in such a way as to be swingable on a shaft 18a at a hole part 14g which is provided in the lower holding plate 14. The rest of the arrangement of the eighth embodiment is the same as the seventh embodiment described above.

In setting a negative film original F which is in a concave shape as shown in FIG. 15, the overhanging member 18 is set in a position indicated by full lines and the film original is set by exactly the same procedures as in the case of the seventh embodiment. In setting a negative film original F of a flat shape or of a convex shape, the overhanging member 18 is turned clockwise as viewed on the drawing to bring it to a position which is indicated by two-dot chain lines, so that the negative film original F can be set perpendicularly from above.

In each of the sixth to eighth embodiments, the buoying restricting means for preventing the negative film original F from buoying up more than a given extent is arranged at the transverse guide 14c which is located near to the hinge shaft 15. However, such buoying restricting means may be arranged either at the other transverse guide 14b which is located farther away from the hinge shaft 15 or at both the transverse guides 14b and 14c. With the buoying restricting means arranged at both the transverse guides, however, the negative film original F must be set on the lower holding plate 14 by warping the negative film original F into a concave shape. In that instance, though the operability of the embodiment is somewhat degraded, the buoyancy of the negative film original F can be more reliably restricted.

As described in the foregoing, in the case of each of the sixth, seventh and eighth embodiments, the buoying restricting means for preventing the negative film original from buoying up more than a given extent from the holding plate is disposed at least on the side of one of a pair of opposed transverse positioning members included in the film holding member of the film projection apparatus. The provision of the buoying restricting means effectively prevents the negative film original from overriding the positioning guide even if the negative film original is in a concave shape. Therefore, the negative film original can be reliably positioned in the transverse direction to give a good image by preventing the negative film original from deviating from its position and from being damaged as a result of overriding the positioning guide. Further, compared with a case where the height of the guide parts is increased for the purpose of enhancing the reliability of positioning the negative film original in the transverse direction, the invented arrangement gives a wider void space around the negative film original for minimization of thermal damage such as thermal deformation of the negative film original due to heat emission by an illumination light source.

What is claimed is:

1. A projection apparatus or film projection system, comprising:

a) illumination means for emitting onto a film a projection light for projecting an image on the film;

b) an index member for focus adjustment;

c) moving means for moving said index member to a focus adjusting position where said index member is in contact with a surface of the film within an optical path of the projection light, wherein said moving means is arranged to cause said index member to enter the optical path of the projection light while being out of contact with the film and to bring said index member into contact with the surface of the film by moving said index member approximately perpendicularly to the surface of the film; and d) focus adjusting means to be operated for focus adjustment of an image of said index member.

2. An apparatus according to claim 1, further comprising a film holding member which is movable relative to a body of the apparatus.

3. An apparatus according to claim 2, further comprising a fixing member for fixing said film holding member to said body.

4. An apparatus according to claim 3, wherein said fixing member is interlocked with said moving means and is arranged to fix said film holding member when said index member enters the optical path of the projection light.

5. An apparatus according to claim 2, further comprising a restricting mechanism for preventing said index member from entering the optical path of the projection light when said film holding member is not in a predetermined position with respect to the apparatus.

6. An apparatus according to claim 2, wherein said restricting mechanism is arranged to prevent said index member from entering the optical path of the projection light when said film holding member is not in a film projectable position.

7. An apparatus according to claim 1, wherein said focus adjusting means includes a lens which is movable along an optical axis of the projection light.

8. A projection apparatus comprising:

a) illumination means for emitting onto a film a projection light for projecting an image of the film; and b) a film holding member for holding the film having a plurality of frames with a length in a longitudinal direction and a length in a transverse direction which is less than the length in the longitudinal direction, said film holding member having a first length in the longitudinal direction which is longer than the length of the film in the longitudinal direction and comprising a first planar portion and a second planar portion, each of which has a second length in a transverse direction which is longer than the length of the film in the transverse direction, said first and second planar portions being pivotably connected to each other at one side and sandwiching the film therebetween, said first planar portion being provided at predetermined intervals with a plurality of restriction portions, each of which corresponds to a frame of the film, for restricting movement of the film in the transverse direction, each said restriction portion being provided with a first extrusion and a second extrusion facing each other and spaced at predetermined distances in the longitudinal direction, with one of said first and second extrusions being provided with an extended portion extending in a transverse direction from said extrusion, with the length of said extended portion being no longer than the length of said extrusion.

9. A projection apparatus according to claim 8, wherein said restriction portions function as portions for positioning the film.

10. A projection apparatus according to claim 8, wherein said extrusion having said extended portion is arranged rotatably relative to said first planar portion.

11. A film holding member for use in a projection apparatus for emitting projection light onto a film by illumination means, comprising:

first and second planar portions pivotably connected for holding therebetween a film having a plurality of frames and a length in a longitudinal direction and a length in a transverse direction that is less than the length in the longitudinal direction, with the film being set on said first planar portion when said first and second planar portions are separated from each other by a predetermined amount, and holding the film after being set between said first and second planar portions, with said planar portions having a first length in a longitudinal direction that is longer than the length of the film in the longitudinal direction and a second length in the transverse direction that is longer than the length of the film in the transverse direction, said first planar portion being provided at predetermined intervals with a plurality of restriction portions, each of which corresponds to a frame of the film, for restricting movement of the film in the transverse direction, each said restriction portion being provided with a first extrusion and second extrusion facing each other located at spaced distances in the longitudinal direction, one of said first and second extrusions being provided With an extended portion extending in a transverse direction from said extrusion, with a length of said extended portion being no longer than the length of said extrusion.

12. A film holding member according to claim 11, wherein said restriction portions function as portions for positioning the film.

13. A film holding member for use in a projection apparatus for emitting projection light onto a film by illumination means, comprising:

first and second planar portions rotatably connected at one end so as to rotate a predetermined angle from a face-to-face state to an open state; and a film positioning member provided on said first planar portion, wherein a maximum angle of rotation of said first and second planar portions when they are in an open state is determined by the length of the film positioning member extending from said first planar portion.

14. A film holding member according to claim 13, wherein said film positioning member is provided at a predetermined distance from a rotational center of said first and second planar portions, and the angle of rotation is set in such a manner that the space between said first and second planar portions at the position of said positioning member when said first and second planar portions rotate to the open state is not greater than the length of said positioning member.

15. A projection apparatus or film projection system, comprising:

a) illumination means for emitting onto a film projection light for projecting an image on the film;

b) an index member for focus adjustment;

c) moving means for moving said index member from exterior of an optical path of the projection light to a focus adjusting position within the optical path; and d) prevention means for preventing movement of said index member to the focus adjusting position by said moving means when the film is not at a film projectable position.

* * * * *

UNITED STATES PATENT AND TRADEMARK OFFICE
CERTIFICATE OF CORRECTION

PATENT NO. : 5,603,560

DATED : February 18, 1997

INVENTOR(S) : Saijo

It is certified that error appears in the above-indentified patent and that said Letters Patent is hereby corrected as shown below:

Item
[56] REFERENCES CITED:

FOREIGN PATENT DOCUMENTS, "1257839  1/1990  Japan" should read --1-257839  10/1989  Japan--.

COLUMN 1:

Line 4, "field" should read --filed--.

COLUMN 5:

Line 10, "sliding;" should read --sliding--.

COLUMN 12:

Line 24, "With" should read --with--.

Signed and Sealed this

Seventh Day of October, 1997

Attest:

BRUCE LEHMAN

Attesting Officer

Commissioner of Patents and Trademarks